UNITED STATES PATENT OFFICE.

LEWIS B. DRAKE, OF COLUMBUS, OHIO, ASSIGNOR TO MOSES H. NEIL AND WILLIAM J. CAMNITZ, OF SAME PLACE.

PRESERVATIVE COMPOUND FOR BRICK, STONE, &c.

SPECIFICATION forming part of Letters Patent No. 442,867, dated December 16, 1890.

Application filed May 21, 1890. Serial No. 352,656. (No specimens.)

*To all whom it may concern:*

Be it known that I, LEWIS B. DRAKE, a citizen of the United States, residing at Columbus, in the county of Franklin and State of Ohio, have invented a certain new and useful Improvement in Preservative Compounds, of which the following is a specification.

My invention relates to preservative mixtures for brick, stone, &c., and the objects of my invention are to provide a colorless preservative compound or mixture consisting of such ingredients as to result when applied to brick, stone, terra-cotta, and other materials in making the same impervious to water and prevent their absorbing weather-stains, &c.; to so produce said mixture as to cause by its application the prevention of the formation and complete removal of saltpeter or other deposits or chemicals from building material, and to produce this mixture in an inexpensive manner.

My composition consists of the following ingredients, combined in the proportions stated, viz: boiled linseed-oil, one-half gallon; water, three pints; gasoline, (seventy-two per cent. proof,) one-half pint; sal-soda, one-half pound; sugar of lead, one-half ounce; silicate of soda, one-half pint. The above-named ingredients are thoroughly mingled by agitation.

In applying the mixture to brick, stone, or other articles which it is desired to preserve the material may be dipped into the mixture, or the latter applied by a brush, as may be convenient or desirable.

By the use of the above composition the material to which it is applied is rendered impervious to water or moisture, and hence to frost.

This mixture is particularly adapted for application to the walls of buildings, in which use it not only prevents the absorption thereby of water or moisture, but operates to preserve the paint or coloring material which may have previously been applied to the wall.

By the application of my preservative to new walls the staining of the latter, which is often the result of the absorption of water dripping from a cornice or roof, is entirely obviated.

It is well known that pressed brick are often disfigured by the formation thereon of a deposit of saltpeter. By the use of my improved composition the pores of the bricks are so closed as to prevent this formation, and in cases where such deposits are already formed on the bricks the application of the composition will result in the removal of the deposits.

Although I have described my composition as particularly applicable to building material, it has been found of great use as a preservative for flexible and other material.

Having now fully described my invention, what I claim, and desire to secure by Letters Patent, is—

The herein-described composition of matter to be used as a preservative, consisting of boiled linseed-oil, water, gasoline, sal-soda, sugar of lead, and silicate of soda, combined substantially in the proportions specified.

LEWIS B. DRAKE.

In presence of—
C. C. SHEPHERD,
E. E. BRAGG.